3,400,064
PROCESS FOR PREPARING AMIDES USING HIGH
ENERGY IONIZING RADIATION
Donald R. Stevens, Pittsburgh, and Philip R. Templin, Oakmont, Pa., assignors to Gulf Research & Development Company, Pittsburgh, Pa., a corporation of Delaware
No Drawing. Filed Dec. 22, 1964, Ser. No. 420,444
20 Claims. (Cl. 204—158)

This invention relates to a process for preparing an amide, particularly a secondary amide.

Briefly, the invention defined and claimed herein involves subjecting a compound selected from the group consisting of urea and thiourea (including substituted derivatives thereof) and a hydrocarbon, particularly an adduct composed of said compound selected from the group consisting of urea and thiourea and said hydrocarbon to ionizing radiation.

The hydrocarbon that is subjected to ionizing radiation with urea or thiourea can be any hydrocarbon, straight or branched chain or cyclic, having from one to 100 carbon atoms in the moleule, preferably having from seven to 50 carbon atoms in the molecule. Examples of such hydrocarbons that can be so employed are normal paraffins, such as $CH_4CH_3CH_3$, $CH_3CH_2CH_3$, etc., and other normal paraffins of the formula $CH_3(CH_2)_aCH_3$, wherein $a$ is an integer from one to 98; paraffins carrying a single side chain of the formula $CH_3(CH_2)_aCH(R)(CH_2)_bCH_3$, wherein $a$ is an integer from 0 to 95, $b$ is an integer from 0 to 95, R is a straight or branched chain alkyl group containing from one to seven carbon atoms, a saturated or unsaturated ring containing five or six carbon atoms, or a condensed ring system, such as $CH_3CH(CH_3)CH_3$, $CH_3CH(CH_3)CH_2CH_3$, etc; branched paraffins carrying two or more branch of the formula $CH_3(CH_2)_aCH(R)(CH_2)_bCH(R')(CH_2)_dCH(R'')(CH_2)_eCH_3$, wherein $a$, $b$, $d$ and $e$ are integers from 0 to 89 and R, R' and R'' are branched or straight chain paraffins or saturated or unsaturated cyclic groups, such as $CH_3CH(CH_3)CH_2CH(CH_3)CH_3$, $CH_3CH(CH_3)CH_2CH(C_2H_5)CH_2CH(CH_3)_2$, etc.; normale alkenes of the formula $CH_3(CH_2)_aCH=CH(CH_2)_bCH_3$, wherein $a$ is an integer from 0 to 96 and $b$ is an integer from 0 to 96, such as $CH_2=CH_2$, $CH_2=CHCH_3$, $CH_3CH=CHCH_2CH_3$, etc.; branched alkenes with a single side chain of the formula $CH_3(CH_2)_aCH(R)(CH_2)_bCH=CH(CH_2)_cCH_3$, wherein $a$ is an integer from 0 to 95, $b$ is an integer from 0 to 95 and $c$ is an integer from 0 to 95, and R is a straight or branched chain or a saturated or unsaturated cyclic group, condensed or uncondensed, such as $(CH_3)_2CHCH=CH_2$, $(CH_3)_2CHCH_2CH=CHCH_3$, etc. branched alkenes with two or more side chains of the formula $CH_3(CH_2)_aCH(R)(CH_2)_dCH=CH(CH_2)_cCH(R')(CH_2)_dCH_3$, wherein $a$, $b$, $c$ and $d$ can be from 0 to 92 and R and R' can be straight or branched chain or saturated or unsaturated condensed or noncondensed cyclic groups; or correspnding straight or branched chain alkenes with more than one pair of unsaturated carbon atoms, and straight or branched chain alkynes with one or more pair of unsaturated carbon atoms. In the preferred embodiment wherein an adduct of urea of thiourea and a hydrocarbon is subjected to ionizing radiation, the hydrocarbon in said adduct is a hydrocarbon falling within the above definition but having seven to 100 carbon atoms, preferably from seven to 50 carbon atoms. In the event the adduct is composed of urea and a hydrocarbon, the hydrocarbon will be essentially a straight chain hydrocarbon, since urea will ordinarily adduct only with a straight chain hydrocarbon or one with limited branching (short chain or cyclic groups) at or near one end of the main chain. When the adduct is composed of thiourea and a saturated hydrocarbon, however, the saturated hydrocarbon will be a branched chain hydrocarbon, since thiourea will ordinarily adduct only with a branched chain hydrocarbon.

The charge to be irradiated in accordance with the procedure of this invention need not be composed of but a single saturated hydrocarbon but can include a mixture of saturated hydrocarbons, and the amide so produced will include as alkyl substituents thereon alkyl substituents derived from said saturated hydrocarbons. Thus, waxes can be employed, whether they be animal, vegetable, mineral, petroleum (microcrystalline or paraffin), or synthetic wax such as derived from the Fischer-Tropsch process. Paraffin waxes are especially preferred in the charge to be irradiated. By "paraffin waxes" we mean to include the hard, crystalline hydrocarbon waxes such are normally derived from mineral oils of the mixed base or paraffinic base type, or from shale oil, or the Fischer-Tropsch synthesis of hydrocarbons. Paraffin waxes that are preferred are those having a melting point of about 90° to about 160° F., preferably about 120° to about 150° F.

When a physical mixture of thte hydrocarbon and urea or thiourea is subjected to ionizing radiation in accordance with the procedure of this invention, the amounts of each component can, of course, vary widely, and as long as the components are in intimate association with each other an amide will be obtained. In general, however, we prefer, on a weight basis, to have the saturated hydrocarbon and urea or thiourea to be present in a ration of about 1:1 to about 1:20, preferably in a ratio of about 1:1 to about 1:10. The conditions employed to form the adduct, and the characteristic of the components of the adduct themselves, will, of course, dictate the amount of each component that will be present. In general, the adduct, on a weight basis, will have the hydrocarbon and the urea or thiourea present in a ratio of about 1:1 to about 1:20, preferably in a ratio of about 1:2 to about 1:10.

A physical mixture of the hydrocarbon and urea or thiourea can be obtained in any convenient manner, for example, by mixing the components thereof until they are in intimate association with each other. The adduct can also be formed in any of the many conventional methods normally employed for such purpose. For methods that can be employed see, for example, Schlenk, W., Annalen der Chemie, 565,204 (1949). Thus, a method for forming an adduct suitable for irradiation in accordance with the process defined herein would involve adding to a hydrocarbon, such as defined above, dissolved in a suitable solvent, such as cyclohexane so that the hydrocarbon concentration will be about 0.1 to about 30 percent by weight of the solution, about three to about 80 mols of urea or thiourea, per mol of said hydrocarbon, activated with about one to about 20 percent by weight thereof of a lower alcohol, such as methanol. The resulting mixture is maintained at a temperature of about 10° to about 70° C. and atmospheric pressure for about 10 to about 1500 minutes. The solid adduct that forms between the charge hydrocarbon and urea or thiourea is then separated by filtration from the liquid phase and subjected to irradiation.

Ionizing radiations suitable for irradiating the above charges can be obtained, for example, using radio isotopes, nuclear reactors or high energy particle accelerators. Examples of radio isotopes which can be used are cobalt 60 for gamma and strontium 90 for beta. Operating nuclear reactors of intermediate or full power size can be used as a source for either gamma rays or neutrons or both. Particle accelerators such as the cyclotron, bevatron, synchronton, Van de Graaff or X-ray machines are particularly suitable.

In effecting irradiation of the above charges, the charge can be introduced into a well in a nuclear reactor or through a tube which traverses the reactor. In some instances where it is desirable to expose the wax to fast or high energy neutrons only, and in the substantial absence of beta and gamma radiation the wax can be irradiated outside of the reactor using a collimated beam of fast neutrons. Such a beam of fast neutrons can be obtained, for example, as described in U.S. Patent No. 2,708,656 to Enrico Fermi and Leo Szilard, by inserting a hollow shaft or tube into the central portion of the reactor. Gamma rays can be screened from the fast neutron beams by means of a sheet of bismuth metal extending across the path of the beam.

A neutron-free radiation source can be obtained directly from a homogenous reactor by separating the radio-active fission gases, xenon and krypton, from the reactor core by conventional or modified gas-liquid separating means. A continuous supply of the radio-active fission gases can be obtained from such reactor. The fission gases have a very high intensity of beta and gamma radiation but a very short half life. These gases possess about one percent of the total fission energy. The gases are chemically inert and therefore would not form undesired side reaction products.

In order to avoid decomposing or otherwise adversely affecting the charge or the product obtained, irradiation is conducted so that the temperature of the charge being irradiated does not rise above 150° C., and preferably remains within a range of about 10° to about 100° C. Pressure is not significant and can be, for example, within a range of about 0 to about ten atmospheres. Irradiation is continued under the above conditions until the charge has absorbed at least about ten megarads of radiation, preferably from about 400 to about 600 megarads of radiation. A megarad is a unit of energy equal to $10^8$ ergs absorbed per gram of material.

At the end of the radiation period the irradiated product is treated to remove unreacted urea or thiourea, and preferably unreacted hydrocarbon, therefrom. The unreacted urea or thiourea can be removed in any convenient method from the irradiated product that does not interfere with the composition of the amide formed during the process. Thus the irradiated product can be contacted with about one to about 20 volumes thereof of a solvent for the urea or thiourea, such as water, an alcohol such as methanol, etc., at a temperature of about 10° to about 100° C. and a pressure of about 0 to about 100 pounds per square inch gauge for about 10 to about 30 minutes. The product left behind can be separated from the solvent-urea solution in any convenient manner, for example, by filtration. The separated product will be the desired amide product and unreacted hydrocarbon, if any. The saturated hydrocarbon can be removed from the product by any convenient manner, for example, by recrystallization from solvent.

The amides produced herein, for example, stearamide, palmitamide, arachidamide, acetamide, thiostearamide, thiopalmitamide, thioarachidamide, thioacetamide, etc., include old and well-known compounds suitable for use as solvents, antiblock and antitack agents, hot-melt coatings, solubility promoters for both alcohol-and oil-soluble drugs, and for hydrolysis to the corresponding acids. In the event it is desired the irradiated product after removal of unreacted urea or thiourea therefrom, but still in association with unreacted saturated hydrocarbon, will also serve as a useful product. This product has been found to be a soft dark brown waxy material and can be employed, for example, to coat paper, metal, etc., with a continuous flexible film suitable for low temperature (30°–70° F.) applications.

The process of this invention can further be defined by the following: There was dissolved in 5000 cc. of cyclohexane at a temperature of 70° C. and atmospheric pressure 454 grams of paraffin wax having a melting point of 130° F. at atmospheric temperature and atmospheric pressure and an average molecular weight of 380. The composition of the paraffin wax is defined below in Table I.

TABLE I

| Carbon Number of hydrocarbon | Percent by weight of such hydrocarbon | Molecular weight of such hydrocarbon |
|---|---|---|
| 19 | 0.10 | 268 |
| 20 | 0.30 | 283 |
| 21 | 1.30 | 297 |
| 22 | 4.40 | 311 |
| 23 | 8.40 | 325 |
| 24 | 11.00 | 339 |
| 25 | 14.00 | 353 |
| 26 | 15.60 | 367 |
| 27 | 13.40 | 381 |
| 28 | 10.70 | 395 |
| 29 | 9.81 | 409 |
| 30 | 6.60 | 423 |
| 31 | 3.20 | 437 |
| 32 | 1.10 | 451 |

There was stirred into 2856 grams of urea at room temperature and room pressure, for the purpose of activating the same, 315 grams of methanol. The activated urea was added to the paraffin wax defined above and the mixture was maintained at a temperature of 45° to 50° C. and atmospheric pressure for 20 hours with occasional stirring. At the end of this period the urea-paraffin wax adduct was recovered from the mixture by vacuum filtration and washed with hot cyclohexane. A sample of this adduct amounting to 494 grams and ¾ inch thick was placed in the target zone of a Van de Graaff accelerator and was irradiated with electrons to a total dosage of 530 megarads. The adduct was then decomposed with water having a temperature of 200° F., as a result of which unreacted urea dissolved in the water and the hydrocarbon portion of the adduct was freed therefrom. The molten product which accumulated on the surface of the water was permitted to cool and solidify to form a cake. The cake was then lifted from the surface of the water and washed with hot water. The cake was subsequently dissolved in an excess of hot Naphtha E (a petroleum fraction boiling in the range of 155°–205° F.) and the solution filtered to remove any urea trapped in the cake. The filtrate was then heated to remove the solvent and recover the waxy product.

A second sample was prepared composed of a physical mixture of urea and paraffin wax employed above. 718 grams of this sample, composed of 13.77 percent by weight of the paraffin wax and 86.23 percent by weight of urea, and ¾ inch thick was subjected to irradiation as above. The irradiated product was also treated as above.

Each of the two irradiated products obtained above and a sample of the unirradiated adduct were analyzed. The results are tabulated below in Table II.

TABLE II

| | A | B | C |
|---|---|---|---|
| | Product from unirradiated wax-urea adduct | Product from irradiated wax-urea adduct | Product from irradiated wax-urea mixture |
| Melting point (D87), ° F | 130.5 | 124.2 | 120.9 |
| Viscosity (Brookfield), cps: | | | |
| 150° F | 8.3 | 410 | 419 |
| 180° F | 6.2 | 145 | 148 |
| 200° F | 6.0 | 84 | 88 |
| Molecular weight (GRM-109) | 380 | 367 | 575 |
| Density at 210° F (pycnometer) | 0.7526 | 0.8227 | 0.8305 |
| Refractive index at 177° F. (GRM-2413) | 1.4323 | 1.4545 | 1.4600 |
| Saponification number (D94) | 0.01 | 11.84 | 9.2 |
| Total acid number (D664) | <0.01 | 4.58 | 3.45 |
| Carbon (GRM-1116), weight percent | 85.40 | 78.38 | 78.45 |
| Hydrogen (GRM-1116), weight percent | 14.47 | 12.47 | 13.14 |
| Nitrogen (GRM-1121A), weight percent | 0.00 | 4.25 | 3.67 |
| Infrared identification of nitrogen compound [1] | None | [2] | [2] |

[1] Based on Spectra-Structure Correlation Chart N. B. Colthup, J Optical Soc. of America 40, 6, 397–400 (June 1950).
[2] Amide (particularly secondary amide).

A study of the above data shows that irradiation of wax and urea under the conditions defined above produced a nitrogen-containing compound identified by infrared analysis as an amide. Infrared showed that there was a significant amount of secondary amides present, although primary amides were undoubtedly also present. The absence of nitrogen in the product (A) recovered from the unirradiated wax-urea adduct clearly shows that no chemical compound was formed from the wax and urea in the absence of high-energy radiation. The data show that the amide was formed when either a simple mixture of wax and urea or a complex adduct of wax and urea was irradiated under the same conditions. Formation of the adduct prior to irradiation appeared to increase the efficiency of the amide formation as indicated by the 16–30 percent increase in amide yield (based on nitrogen content, saponification number and acid number) of product (B) from irradiated adduct versus product (C) from irradiated mixture. The greater efficiency stems from the much more intimate association (in the angstrom range) of the urea and wax when in the adduct form.

The significant increase in density, refractive index, and molecular weight of C over B indicates that more crosslinking between hydrocarbon molecules occurred when the urea and wax were irradiated as a simple mixture. The urea molecules in the adduct matrix isolate the hydrocarbon chains which prevents crosslinking although there can be end to end linkage because the chain ends are not necessarily isolated. Because of the isolation of hydrocarbon chains in the adduct, we prefer irradiating the urea and wax in the adduct form to give better control over the structure of products obtained (less branching, less crosslinking, and less degradation when the adduct is formed prior to irradiation).

Although we can subject to ionizing radiation a physical mixture of urea or thiourea and a saturated hydrocarbon to obtain a secondary amide in accordance with the procedure defined herein, it is apparent that we prefer to subject to ionizing radiation an adduct of the two defined components. In the adduct individual urea or thiourea molecules are in close proximity with molecules of the saturated hydrocarbon and therefore reaction between the two is facilitated during the process. The adduct matrix also isolates the individual hydrocarbons from each other and therefore crosslinking between individual hydrocarbon molecules is inhibited. Since the urea in the adduct matrix has a tendency to shield the saturated hydrocarbon associated therewith from the atmosphere, oxidation of the hydrocarbon is also inhibited.

The reactions leading to the desired compounds can be expressed as follows:

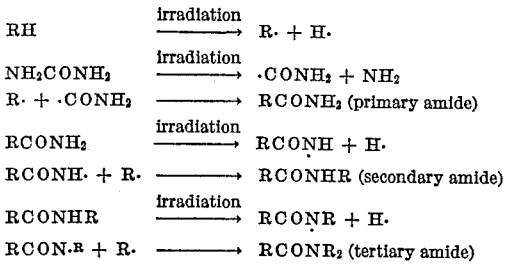

We believe that the ratio of primary, secondary and tertiary amides obtained can be governed to a considerable degree by the radiation dosage. At low dosages, the primary amide would be predominant. At higher dosages, increased yields of secondary and teritary amides would be expected.

Obviously, many modifications and variations of the invention, as hereinabove set forth, can be made without departing from the spirit and scope thereof, and therefore only such limitations should be imposed as are indicated in the appended claims.

We claim:

1. A process for preparing an amide which comprises subjecting a compound selected from the group consisting of urea and thiourea and a hydrocarbon to high energy radiation.

2. A process for preparing an amide which comprises subjecting urea and a hydrocarbon to high energy ionizing radiation.

3. A process for preparing an amide which comprises subjecting thiourea and a hydrocarbon to high energy ionizing radiation.

4. A process for preparing an amide which comprises subjecting urea and a paraffin was to high energy ionizing radiation.

5. A process for preparing an amide which comprises subjecting thiourea and a paraffin wax to high energy ionizing radiation.

6. A process for preparing an amide which comprises subjecting an adduct composed of a compound selected from the group consisting of urea and thiourea and a hydrocarbon to high energy ionizing radiation.

7. A process for preparing an amide which comprises subjecting an adduct composed of urea and a hydrocarbon to high energy ionizing radiation.

8. A process for preparing an amide which comprises subjecting an adduct composed of thiourea and a hydrocarbon to high energy ionizing radiation.

9. A process for preparing an amide which comprises subjecting an adduct composed of urea and a paraffin wax to high energy ionizing radiation.

10. A process for preparing an amide which comprises subjecting an adduct composed of thiourea and a paraffin wax to high ionizing radiation.

11. A process for preparing an amide which comprises subjecting an adduct composed of a compound selected from the group consisting of urea and thiourea and a hydrocarbon to high energy ionizing energy radiation at a temperature of about 10° to about 150° until at least about 10 megarads of radiation have been absorbed.

12. A process for preparing an amide which comprises subjecting an adduct composed of urea and a hydrocarbon to high energy ionizing radiation at a temperature of about 10° to about 150° C. until at least about 10 megarads of radiation have been absorbed.

13. A process for preparing an amide which comprises subjecting an adduct composed of thiourea and a hydrocarbon to high energy ionizing radiation at a temperature of about 10° to about 150° C. until at least about 10 megarads of radiation have been absorbed.

14. A process for preparing an amide which comprises subjecting an adduct composed of urea and a pariffin wax to high energy ionizing radiation at a temperature of about 10° to about 150° C. until at least about 10 megarads of radiation have been absorbed.

15. A process for preparing an amide which comprises subjecting an adduct composed of thiourea and a paraffin wax to high energy ionizing radiation at a temperature of about 10° to about 150° C. until at least about 10 megarads of radiation have been absorbed.

16. A process for preparing an amide which comprises subjecting an adduct composed of a compound selected from the group consisting of urea and thiourea and a hydrocarbon to high energy ionizing radiation at a temperature of about 10° to about 150° C. until at least about 10 megarads of radiation have beenn absorbed and thereafter decomposing the irradiated adduct to remove said unreacted compound therefrom.

17. A process for preparing an amide which comprises subjecting an adduct composed of urea and a hydrocarbon to high energy ionizing radiation at a temperature of about 10° to about 150° C. until at least about 10 megarads of radiation have been absorbed and thereafter decomposing the irradiated adduct to remove unreacted urea therefrom.

18. A process for preparing an amide which comprises subjecting an adduct composed of thiourea and a hydrocarbon to high energy ionizing radiation at a temperature of about 10° to about 150° C. until at least about 10 megarads of radiation have been absorbed and thereafter decomposing the irradiated adduct to remove said unreacted thiourea therefrom.

19. A process for preparing an amide which comprises subjecting an adduct composed of urea and a paraffin wax to high energy ionizing radiation at a temperature of about 10° to about 150° C. until at least about 10 megarads of radiation have been absorbed and thereafter decomposing the irradiated adduct to remove unreacted urea therefrom.

20. A process for preparing an amide which comprises subjecting an adduct composed of thiourea and a paraffin wax to high energy ionizing radiation at a temperature of about 10° to about 150° C. until at least about 10 megarads of radiation have been absorbed and thereafter decomposing the irradiated adduct to remove said unreacted thiourea therefrom.

References Cited

Chemical Abstract, vol. 54 (1960), p. 1290i.

HOWARD. S. WILLIAMS, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,064                  September 3, 1968

Donald R. Stevens et al.

It is certified that error appears in the above identified patent and that said Letters Patent are hereby corrected as shown below:

Column 1, line 54, "$CH_3(CH_2)_a CH(R)(CH_2)_d$" should read -- $CH_3(CH_2)_a CH(R)(CH_2)_b$ --; line 58, "correspnding" should read -- corresponding --; line 66, after "having" insert -- from --. Column 2, line 31, "ration" should read -- ratio --. Column 4, TABLE I, first column, lines 13 and 14 thereof, "$3\frac{1}{2}$" should read -- $31\frac{1}{2}$ --. Column 6, lines 5 and 37, "energy", each occurrence, should read -- ionizing --.

Signed and sealed this 10th day of February 1970.

(SEAL)
Attest:

Edward M. Fletcher, Jr.
Attesting Officer

WILLIAM E. SCHUYLER, JR.
Commissioner of Patents